United States Patent [19]

Nelson

[11] Patent Number: 4,618,352

[45] Date of Patent: Oct. 21, 1986

[54] DUST COLLECTOR

[76] Inventor: Robert T. Nelson, P.O. Box 763, Oklahoma City, Okla. 73101

[21] Appl. No.: 435,940

[22] Filed: Oct. 22, 1982

[51] Int. Cl.[4] ............................................. B01D 46/04
[52] U.S. Cl. ...................................... 55/287; 55/319; 55/335; 55/424; 55/498
[58] Field of Search ................. 55/273, 286, 287, 302, 55/319, 335, 379, 424, 426, 429, 498

[56] References Cited

U.S. PATENT DOCUMENTS

| | | |
|---|---|---|
| 3,008,542 | 11/1961 | Steele ................................... 55/287 |
| 3,097,936 | 7/1963 | Lincoln . |
| 3,266,225 | 8/1966 | Barr . |
| 3,385,033 | 5/1968 | Basore et al. ........................ 55/302 |
| 3,430,419 | 3/1969 | Reinecke et al. ..................... 55/302 |
| 3,951,623 | 4/1976 | Furstenberg . |
| 3,963,467 | 6/1976 | Rolschau . |
| 4,174,204 | 11/1979 | Chase ................................... 55/429 |
| 4,180,390 | 12/1979 | Furstenberg ......................... 55/429 |
| 4,209,310 | 6/1980 | Berkhoel ............................. 55/273 |
| 4,329,161 | 5/1982 | Osborn . |
| 4,372,762 | 2/1983 | Cooley ................................ 55/302 |

FOREIGN PATENT DOCUMENTS 1009993  11/1965  United Kingdom ................ 55/302

Primary Examiner—David L. Lacey
Attorney, Agent, or Firm—Bernard, Rothwell & Brown

[57] ABSTRACT

A dust collector including a plurality of filter units and an arrangement for periodically providing reverse flow through a single filter unit to remove dust therefrom while maintaining normal flow of air through the remaining units. The filter units are connected to a plurality of ducts, and a centrifugal fan is provided for effecting reverse flow of air through the ducts sequentially to remove collected dust from the filter units. A transverse duct extends transversely of and contiguous to the first-mentioned ducts. A plurality of openings are provided for selective communication between the transverse duct and the first-mentioned ducts. A control vane is provided within each of the first-mentioned ducts and is movable between a first position wherein it blocks the corresponding opening to permit normal flow of air through that duct and a second position wherein it blocks normal flow of air and directs air from the centrifugal fan in a reverse flow through the duct to remove the dust from the filter unit connected thereto. A rotatable shaft having a plurality of notched discs mounted thereon is provided for actuating the movable vanes. The notched portions of the discs are angularly displaced from each other to effect sequential movement of the vanes.

10 Claims, 9 Drawing Figures

DUST COLLECTOR

BACKGROUND OF THE INVENTION

1. Field of the Invention

This invention relates to dust collectors for removing dust from air in any location, and more particularly to dust collectors which can effect cleaning of filters while maintaining a filtering operation.

2. Description of Prior Art

Many areas, particularly under present high environmental standards, require continuous cleaning of air so that the dust therein is below maximum limits. To perform their function in an optimum manner, such air-cleaning apparatus, or dust collectors, as they are normally called, should be sufficiently light in weight so that they can be made portable and thereby moved easily from one location to another as the need arises. Further, it is necessary from time to time to remove dust from the filter elements of such dust collectors so that their efficiency and effectiveness may be maintained at a proper level, and it is desirable that this be done without interrupting the continuous cleaning of the air of the surrounding environment.

There are dust collectors presently on the market which perform such continuous cleaning operation and which, on some programmed basis, effect removal of dust from individual filters so as to maintain their effectiveness. Presently available dust collectors of this type normally effect the removal of collected dust from individual filters by directing a pulse of air at high pressure against the filter to be cleaned. Provision of such high pressure air to effect the jet pulse cleaning requires, of course, an air compressor and also requires the associated conduits and valving for controlling the supply of high pressure air for this purpose. This auxiliary equipment is costly and involves significant weight. It therefore not only adds significantly to the total cost of the installation, but makes it difficult to provide a dust collector of adequate capacity which is truly portable. Prior art patents show dust collectors employing a plurality of filter elements and including provision for sequentially cleaning the filters while continuing to employ the remaining filters in the cleaning operation. However, such prior art apparatus with which the applicant is familiar is of a relatively complex nature and requires a relatively complex electrical system for operating switches and solenoids to effect the desired flow of air for simultaneously effecting air cleaning and cleaning of individual filters.

In the apparatus of this invention, by contrast, a relatively simple mechanical structure employing a single shaft with a plurality of notched discs, or cams, is utilized for effecting the necessary reverse flow while normal flow of air for cleaning the environment is continued. The apparatus is economical in cost, simple in construction, relatively light in weight so as to be portable, and avoids the necessity of complex electrical systems, valves, or air compressors required in prior art apparatus.

Accordingly, it is an object of this invention to provide a continuous cleaning dust collector including provision for sequentially removing dust from filters of the dust collector while maintaining the air cleaning operation.

It is another object of this invention to provide apparatus of this type which does not require an air compressor and a supply of air at high pressure for cleaning the filters and which eliminates the need for associated conduits and valving.

It is a further object of this invention to provide apparatus of this type in which a simple mechanical arrangement effects reverse flow of air for removing dust from one filter while continuing the normal flow of air through the remaining filters.

It is a further object of this invention to provide apparatus of this type which is simple in construction, light in weight, low in cost, and which requires a minimum of maintenance.

SUMMARY OF THE INVENTION

In carrying out this invention, in one form thereof, a plurality of dust collecting filter units are arranged within a housing which has one or more openings for entry of air to be cleaned from the surrounding environment. A centrifugal fan is provided for drawing the air through the filter units. The filter units are connected to the centrifugal fan through a plurality of ducts, one duct being connected to each of the filter units. Along a portion of their length, these ducts are arranged in side-by-side relationship. A second centrifugal fan, driven along with the first centrifugal fan by a common motor, is provided for effecting reverse flow of air through each of the ducts sequentially to remove collected dust from the filter units. A transverse duct is connected to the second centrifugal fan and extends transversely of and contiguous to the side-by-side portion of the first-mentioned plurality of ducts. A plurality of openings are provided, each of said openings providing communication between the transverse duct and a corresponding one of the first-mentioned ducts. A control vane is provided within each of the first-mentioned ducts and is arranged to be movable between a first position wherein it blocks its corresponding one of said openings to prevent reverse flow of air through that duct and a second position wherein it blocks flow of air through that duct to the first centrifugal fan and directs the air from the second centrifugal fan in a reverse flow through the duct to remove the dust from the filter connected thereto. A rotatable shaft is positioned generally parallel to the transverse duct and a plurality of cams in the form of notched discs are mounted on this shaft for actuating the movable vanes, one such disc being positioned to actuate each of said control vanes. The notched portions of the discs are angularly displaced from each other so that as the shaft rotates the discs sequentially effect movement of the vanes so as to sequentially effect reverse flow of air to the several filters while a regular filtering operation continues to be performed by the remaining filters.

DESCRIPTION OF THE PREFERRED EMBODIMENTS

Figure 1:
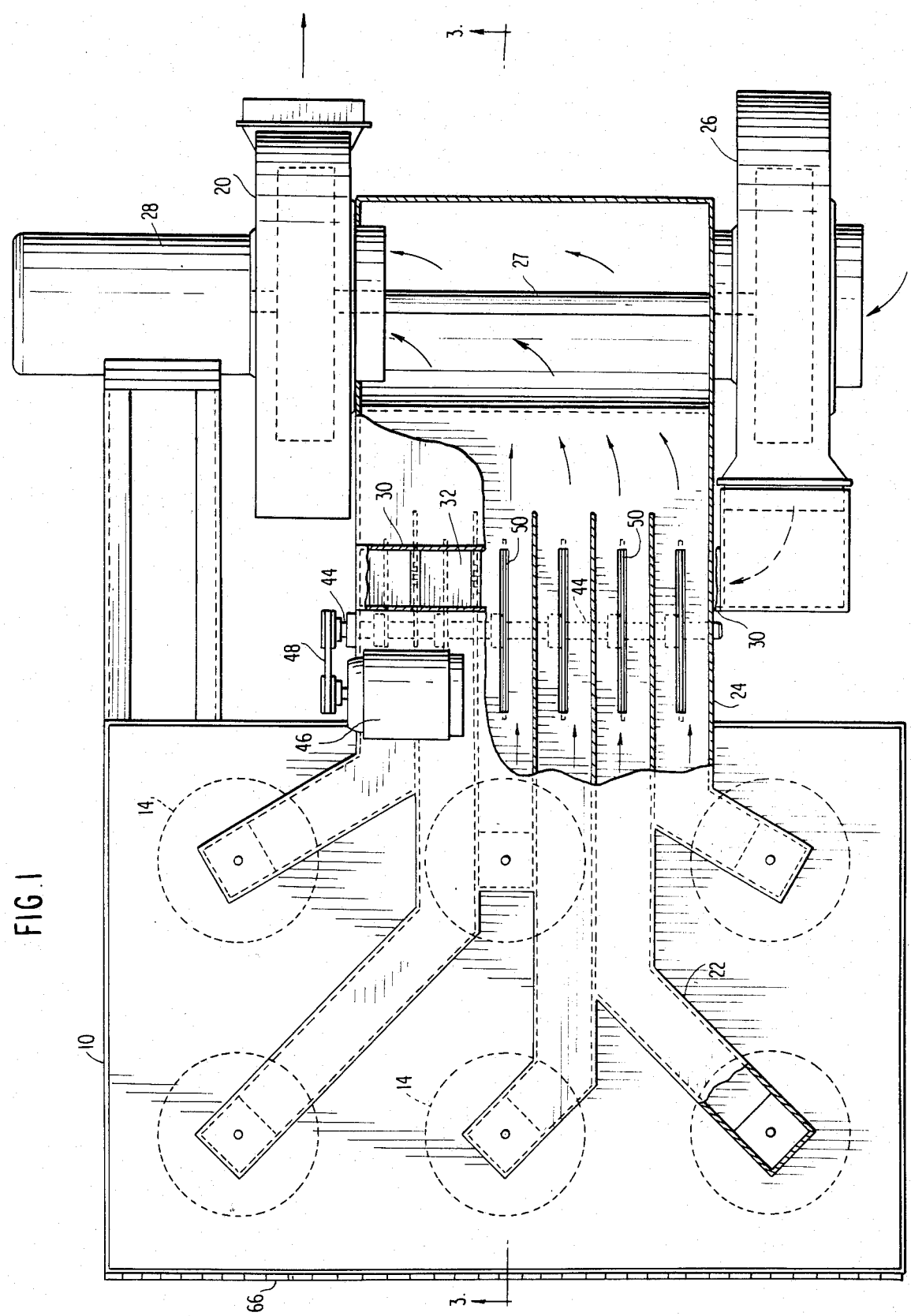
FIG. 1 is a plan view, partly broken away, illustrating one embodiment of the dust collector of this invention.
Figure 2:
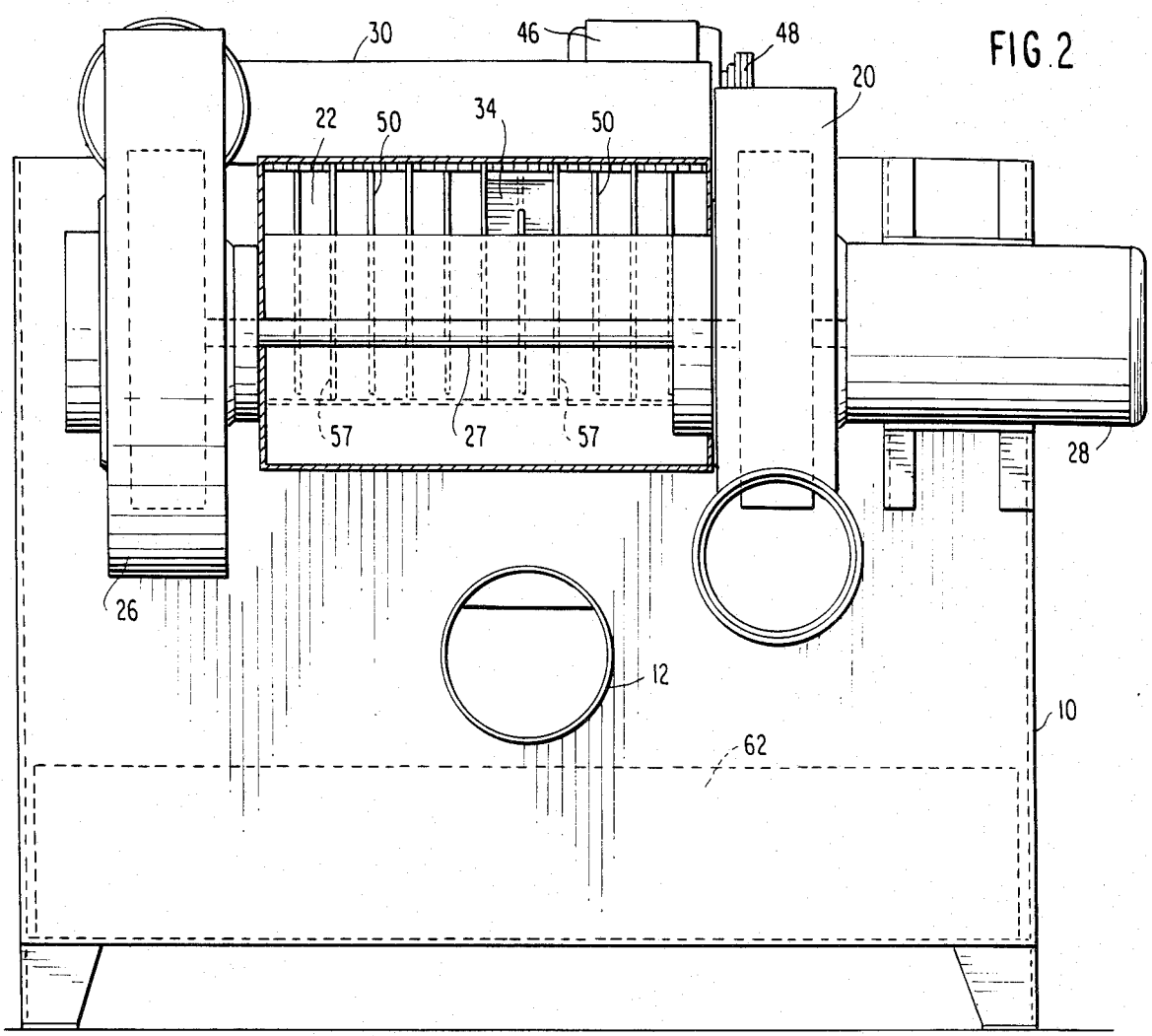
FIG. 2 is an end view of the dust collector looking from the right hand side in FIG. 1.
Figure 7:
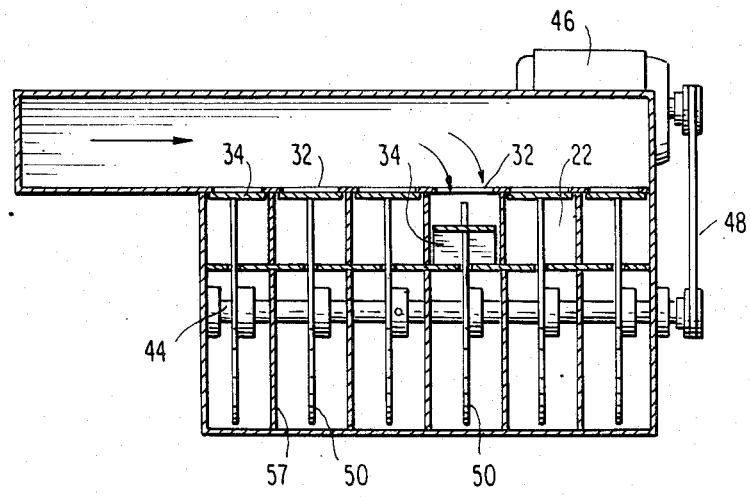
FIG. 7 is a sectional view taken along the line 7—7 in FIG. 3.
Figure 3:
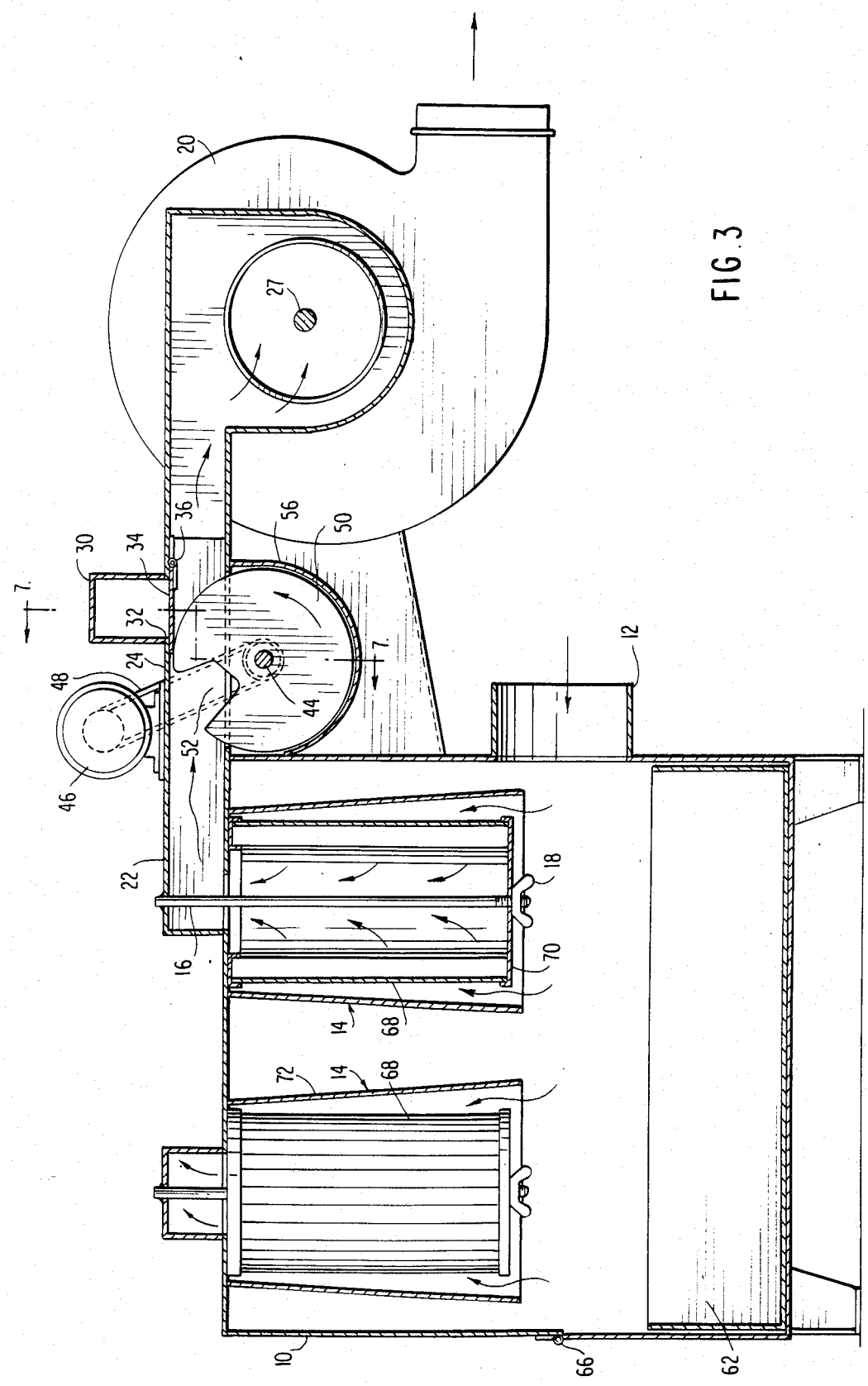
FIG. 3 is a sectional view taken along the line 3—3 in FIG. 1.

Referring to FIGS. 1, 2 and 3, the dust collector of this invention includes a housing 10 into which air to be cleaned is received from the surrounding environment by one or more inlet openings 12. Mounted within the housing 10 are a plurality of filter units 14. The filter units are suspended from the top wall of the housing by means of bolts or studs 16 and wing nuts 18, which are threaded onto the studs to removably support the filter units.

In order to effect movement of air through the filter units for removal of dust therefrom, a first centrifugal fan 20 is provided. The centrifugal fan is connected to the filter units 14 by a plurality of ducts 22, one such duct being provided for each filter unit. The fan end of the ducts is connected to a common manifold for discharge of air from the ducts through the fan. As shown best in FIG. 1, the filter units 14 are arranged in widely spaced relationship within the housing 10 to provide effective filtering action. The ducts are shaped so that intermediate portions thereof, indicated at 24 in FIG. 1, are arranged in adjacent side-by-side relationship.

A second centrifugal fan 26 is provided to effect reverse flow of air to the filter units for cleaning collected dust from the filter units at intervals. The fans 20 and 26 are mounted on a common shaft 27 and driven by a common motor 28. Connected to the outlet of the centrifugal fan 26 is a transverse duct 30. The duct 30 is positioned directly above the plurality of ducts 22 at the side-by-side portions 24 thereof and extends transversely of these ducts along the tops thereof. The duct 30 is open at the bottom portion thereof. A plurality of openings 32, one in the top wall of each of the plurality of ducts 22 provide communication between the transverse duct and the aforementioned plurality of ducts extending to the filter units. Under proper conditions, air is supplied from the centrifugal fan 26 through the transverse duct and a selected one of these openings 32 to provide reverse flow through the corresponding duct 22 to clean the dust from the filter connected thereto.

Figure 4:
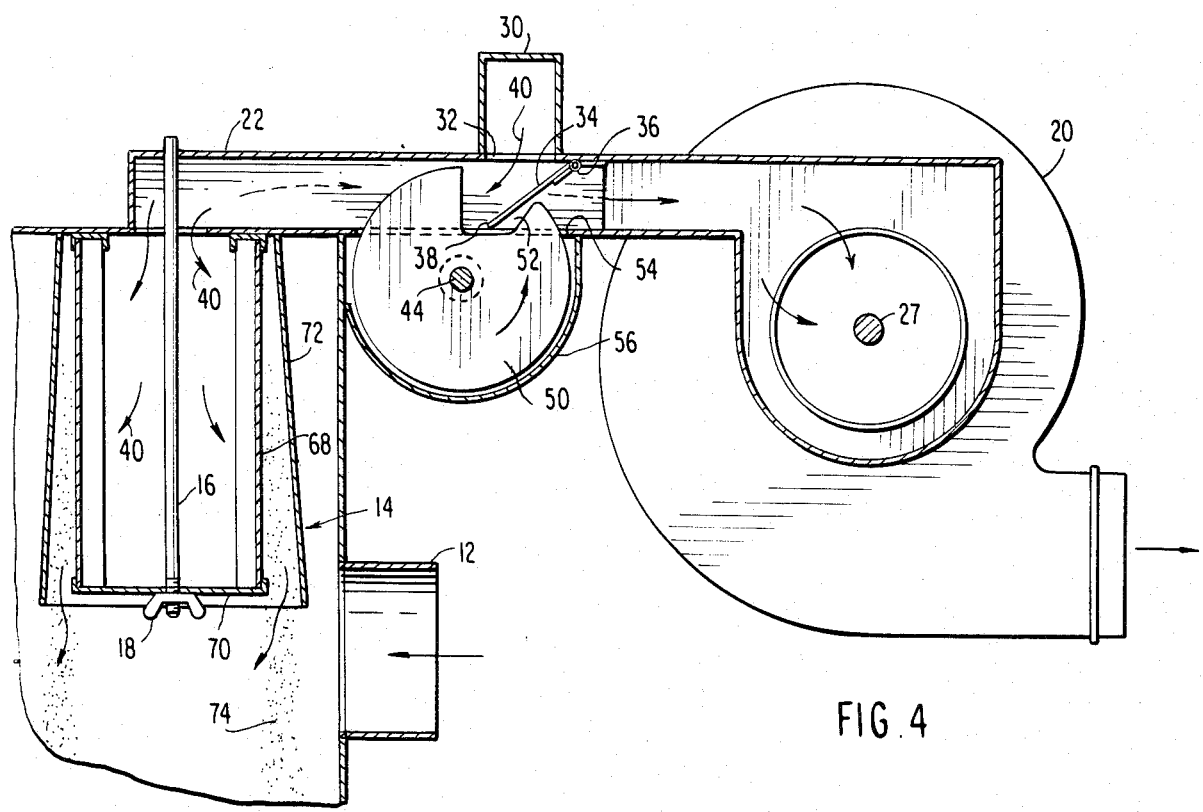
FIG. 4 is a view similar to FIG. 3, but shows the control vane in its reverse flow position.

In order to control such reverse flow through the openings 32, a control vane 34 is provided for each of the openings 32. As best shown in FIGS. 3 and 4, each control vane 34 is mounted for swinging movement by means of a hinge 36 supported on the top wall of the corresponding duct 22. As best seen by comparing FIGS. 3 and 4, the control vane is movable between an upper position, shown in FIG. 3, wherein it blocks the opening 32 and prevents reverse flow into the duct 22 from the transverse duct 30 and a second position, shown in FIG. 4, wherein the vane extends diagonally across the duct 22 with its free end 38 in engagement with the bottom wall of the duct. In the first, or upper, position shown in FIG. 3, air flow is provided through the duct from the corresponding filter unit 14 to the centrifugal fan 20, as indicated by the arrows in FIG. 3. Conversely, as shown in FIG. 4, when the control vane 34 is in its lower position, it blocks flow of air from the corresponding filter unit to the fan 20 and at the same time provides communication with the duct 30 for reverse flow of air, indicated by the solid line arrows 40 in FIG. 4, to direct such air in reverse flow through the corresponding filter unit to remove dust therefrom.

The centrifugal fan 26, unlike air compressors provided with some prior art structures which operate at a relatively high pressure and remove dust from the filters by a jet action, provides a high volume of air at a relatively low pressure for effectively removing dust from the filter units. The use of a centrifugal fan providing a high flow of air at low pressure eliminates the need for an air compressor and the associated conduits and valves associated therewith, and thereby substantially reduces the weight of the dust collector, enabling it to be made of a portable nature and thereby substantially increasing its versatility. Moreover, as shown in FIGS. 1 and 2, the utilization of a centrifugal fan for such reverse flow enables both the centrifugal fan 20 used in the regular air-cleaning operation and the reverse flow centrifugal fan 26 to be mounted on a common shaft 27 and driven by a common motor 28.

A purpose of this invention is to provide for removal of dust from the filter units at intervals in order to maintain their effective filtering action and at the same time to provide continuous air-cleaning operation by the dust collector. In order to achieve this result, provision is made for actuating the control vanes in a sequential manner so that the dust may be removed from one of the filter units while the remaining units, five in the dust collector illustrated, continue their air-cleaning operation. In order to effect sequential operation of the control vanes 34 to achieve this result, a rotatable shaft 44 is provided extending transversely of the ducts 22 in the region of the portions 24 thereof. The shaft 44 is driven by a motor 46 through any suitable connection, such as a belt 48. Mounted in spaced relationship along the length of the shaft 44 are a plurality of cams in the form of disks 50, each having a notch or recess 52. One such disc 50 is provided for each duct 22, the disc being mounted generally centrally of the width of its corresponding duct 22 and extending through a slot 54 in the bottom wall thereof. In order to prevent air leakage through these slots to the surrounding environment, a wall 56 of semicircular cross-section is provided below the bottom of the discs 50, and partitions 57 are provided in this space between discs 50.

It can be seen that when a disc is in a position shown in FIG. 4, the notch 52 therein is aligned with the corresponding control vane 34 so that the vane can fall downwardly into the notch and engage the bottom wall thereof to provide for reverse flow as previously described. When the disc is rotated beyond this position, for example, as shown in FIG. 3, the circumference of the disc engages the control vane 34 to hold it in engagement with the top wall of the duct 22 and block communication between the duct 22 and the transverse duct 30. Since, as described later, the notch 52 occupies less than one-sixth of the circumference of the disc 50, it can be seen that each control vane is held in its closed position through a major portion of each cycle of operation.

Figure 5:
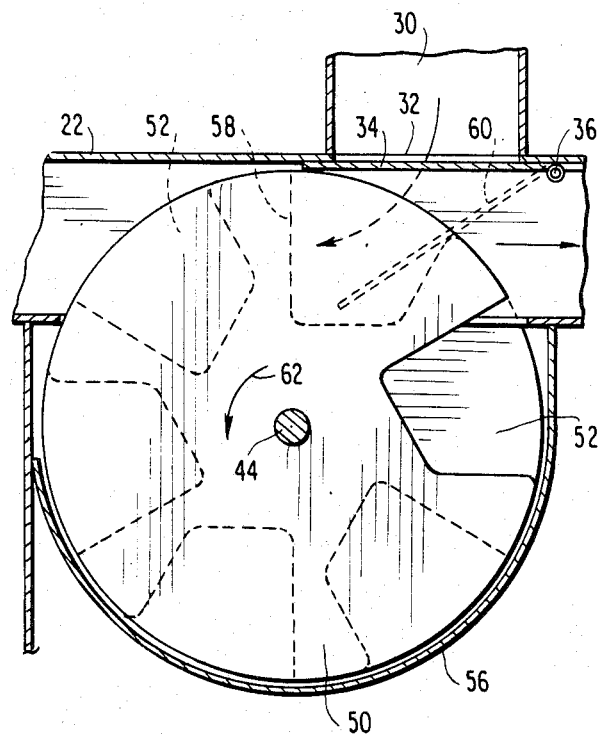
FIG. 5 is an enlarged view showing the relationship of the notches in the several notched discs employed.
Figure 6:
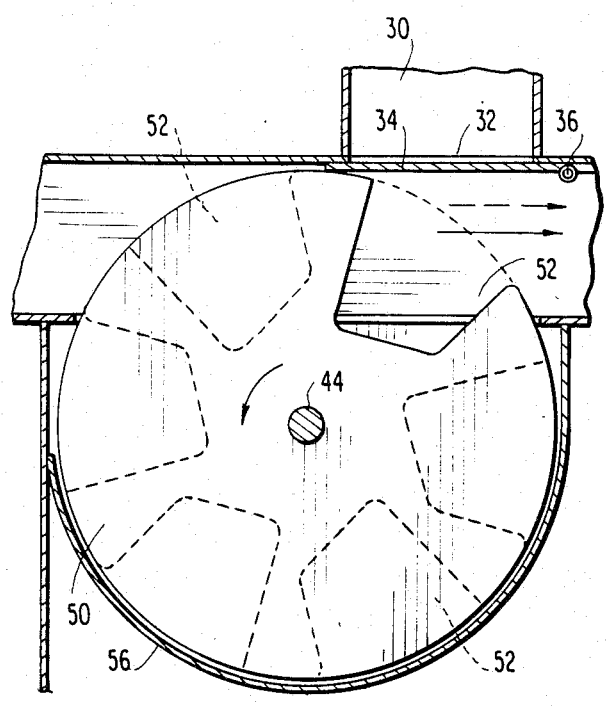
FIG. 6 is a view similar to FIG. 5, but illustrates the rotatable shaft and notched discs mounted thereon in the position wherein all of the control vanes are in the upper position.

In accordance with this invention, it is desired to provide sequential operation of the control vanes in the several ducts so that while reverse flow is provided through one of the ducts for removing dust from the corresponding filter unit, normal air-cleaning operation is provided by the remaining five filter units through the ducts connected thereto. To provide for this sequential operation in a simple manner without the necessity of electrical switches, solenoids, etc., the discs 50 are arranged on the shaft 44 with their notches 52 angularly displaced from each other, as best shown in FIGS. 5 and 6. It can be seen in FIG. 5 that when one notch, indicated by dotted lines 58 in that figure, is in its upper position so that its corresponding control vane, indicated by dotted lines at 60 in FIG. 5 is in its lower position so as to permit reverse flow through the corresponding duct, the notches of the remaining five discs are so positioned that the circumferences of these discs engage the corresponding control vanes and hold these vanes in the upper position shown at 34 in FIG. 5 so that normal air-cleaning operation continues through the remaining five ducts. Thus, by this simple arrangement of a plurality of cams, or notched discs, positioned along a shaft, a reliable arrangement is provided for sequentially cleaning each of the filter units while maintaining a continuous filtering operation on the air to be cleaned. Further, this is accomplished in an inexpensive manner by employing a relatively inexpensive motor to drive a single shaft with simple cams thereon in a continuous manner (approximately two revolutions per minute) to effect the desired sequential cleaning operation.

In the specific embodiment disclosed, as shown in FIG. 6, the notches 52 are made of such size that during intervals all six control vanes 34 are held in the upper or closed position so that no reverse flow is permitted to any of the filter units. This is accomplished by forming the notches so that the mouth of each notch occupies only approximately 55 degrees of the circumference of the disc. Since the notches are displaced at intervals of 60 degrees around the 360-degree circumference of the disc, there is an interval of approximately 5 degrees when all six control vanes are in the upper or closed position.

In the specific embodiment of the invention disclosed, a dust-collecting receptacle or pan 62 is provided at the bottom of the housing 10. The housing is provided with a door 64 hinged at 66 to provide access to the receptacle 62 for removal to empty dust therefrom when necessary. The receptacle 62 is positioned about 14 to 16 inches below the bottom of the filter units 14. Air entering through the inlet opening 12 moves into the very large area provided in the housing beneath the filters and, as a result, its movement is caused to slow substantially. A significant amount of dust therein drops into the receptacle 62 because of this reduction in speed of movement of the air. This reduces the amount of dust in the air which actually reaches the filter units 14.

Each filter unit 14 in the embodiment shown in FIGS. 1-7 includes a cylindrical filter 68 which is made from pleated or accordion-folded paper so as to provide a substantial filtering surface. As best shown in FIGS. 3 and 4, the filter 68 is removably held in position at the top of the housing by a pan 70 which is held against the bottom of the filter 68 by wing nut 18 engaging the stud 16. In order to prevent the dust removed from one filter unit during reverse flow of air from being discharged directly against the adjacent filter units and thereby tending to collect thereon, each filter unit includes an impervious shield 72 arranged around the filter 68. In the embodiment shown, the shield is frusto-conical in shape, having its largest dimension at the bottom. The frusto-conical shape provides a space for dust dislodged from the filter to fall downwardly into the receptacle 62, as shown at 74 in FIG. 4. In order to further minimize the possibility of dislodged dust from one filter being blown towards adjacent filters, the shield 72 is made to extend below the bottom of the filter 68. In one specific embodiment of this invention, the filter 68 is approximately 7 inches in diameter; the shield is approximately 7 inches in diameter at the top and approximately 9 inches in diameter at the bottom, and extends approximately ½ inch below the bottom of the filter 68. The filter unit 14 is positioned approximately 14 to 16 inches above the receptacle 62.

Figure 8:
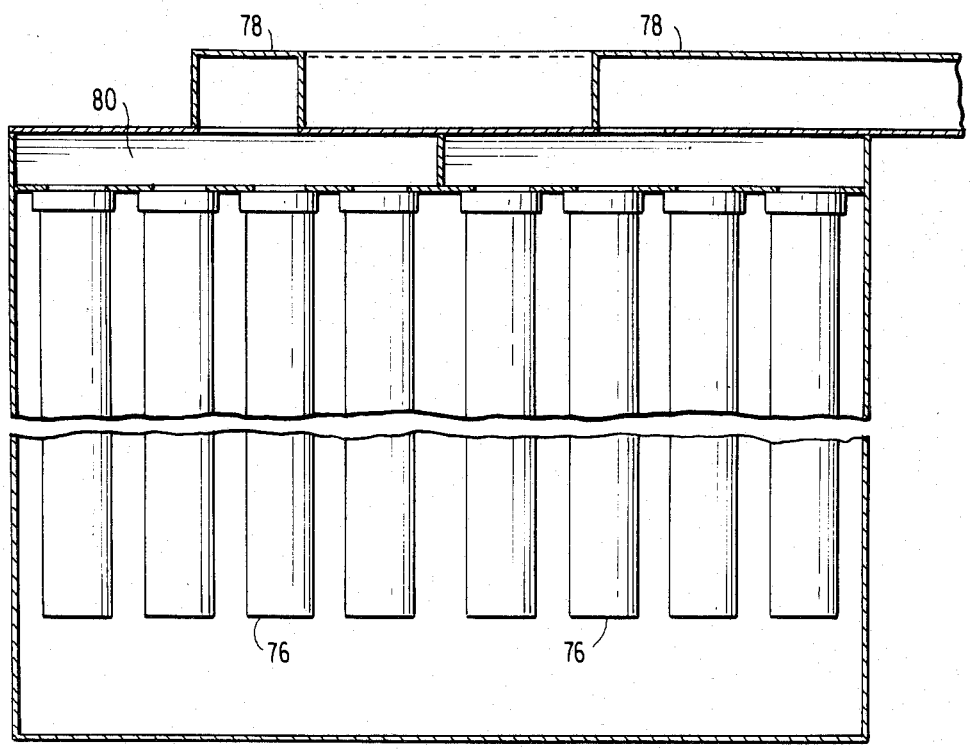
FIG. 8 is an elevation view, partly in section, showing a modified form of filter unit employed with this invention.
Figure 9:
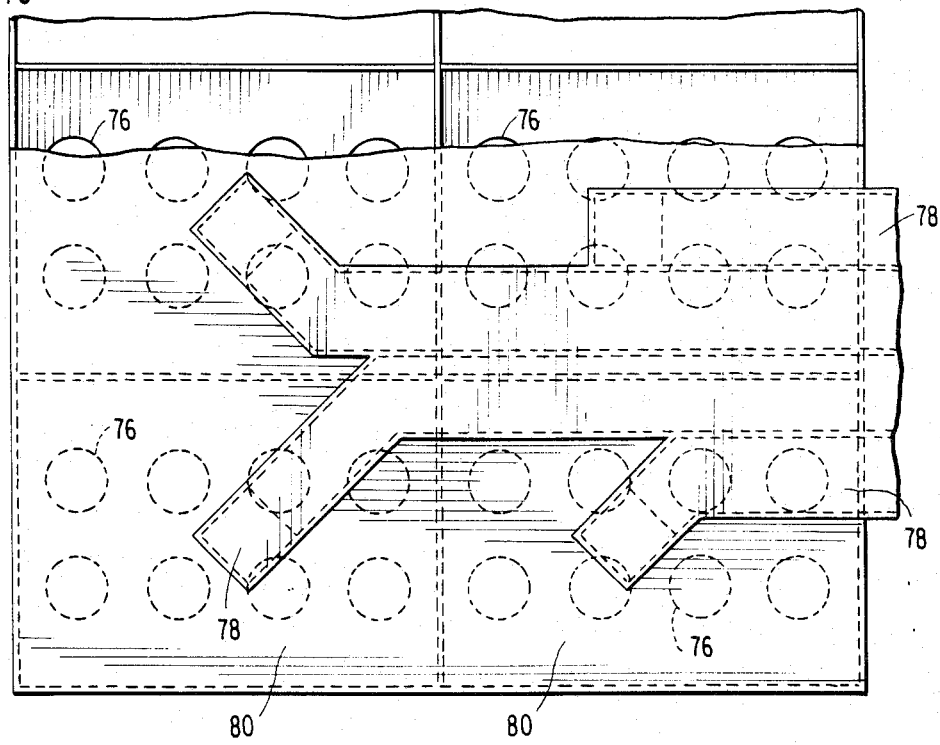
FIG. 9 is a top view of the modified form of the invention shown in FIG. 8.

A modified form of the invention is shown in FIGS. 8 and 9. This differs from the form of invention just described only in the nature of the filter units employed. In the form of invention shown in FIGS. 8 and 9, in lieu of a single accordion-fold paper filter, a plurality of depending cloth bags 76 are provided for each of the ducts 78, corresponding to the ducts 22 in the form of invention previously described. In the modified form shown in FIGS. 8 and 9, each duct is connected to a chamber, for example 80, from which eight cloth bags 76 depend. The reason for using the greater number of cloth bags is that the surface of each bag is lesser in extent than the accordion fold or pleated filter employed in the embodiment shown in FIGS. 1-7. Accordingly, to provide sufficient filtering surface, a plurality of bags are utilized with each duct.

Any desired number of chambers 80 and ducts 78 may be employed, depending upon the desired capacity. In the actual embodiment illustrated in FIGS. 8 and 9, eight such chambers and ducts are utilized but only four have been illustrated, since the remainder involve essentially a duplication of those shown. It will be realized that the remainder of the dust collector in the embodiment of FIGS. 8 and 9 including the side-by-side duct portions, the transverse duct, the centrifugal fans, the rotating discs, etc., are identical with those in the embodiment previously described with the exception that eight discs would be arranged on the shaft because of the utilization of eight ducts in this second embodiment.

It is believed that the operation of the dust collector will be clear from the description that has been given. By way of a brief summary, it is noted that the fans 20 and 26 are driven continuously by the motor 28 and the shaft 44 with the discs 50 mounted thereon is driven continuously by the motor 46. The shaft 44, in a specific embodiment of the applicant's invention, is driven approximately 2 revolutions per minute so that each of the filter units is subjected to reverse flow for removing dust therefrom for a few seconds during each 30-second interval. As the shaft rotates, the notched discs cause the vanes 34 to be moved sequentially into the lower position for reverse flow beginning with the duct at one side of the parallel side-by-side arrangement of ducts, proceeding sequentially through the ducts to the one at the other side, and then repeating the cycle.

By the applicant's arrangement, the reverse flow for cleaning each filter unit periodically is accomplished in a simple manner without the need for switches, solenoids, or electrical connections, utilizing merely a simple arrangement of a plurality of notched discs on a continuously rotating shaft. Further, as pointed out earlier in the specification, the applicant's arrangement permits utilization of a low-pressure, high flow centrifugal fan for effecting the reverse flow, and avoids the necessity of high pressure jet pulse for cleaning the filter units. Such arrangement, which necessitates air under relatively high pressure and therefore requires the use of an air compressor with associated piping and valving, adds significantly to the cost and to the weight of the dust collector. The applicant's dust collector is both more economical and lighter in weight so that even with substantial capacity it still can be made portable so as to be readily movable to any location in which it is needed.

While particular embodiments of the applicant's dust collector has been shown and described, it will be understood that modifications of these structures, within the scope of the invention, will occur to those skilled in the art. It is intended, therefore, by the appended claims, to cover such modifications as come within the spirit and scope thereof.

It is claimed:

1. A dust collector comprising:
   (a) a housing having inlet means for receiving air to be cleaned;
   (b) a plurality of filter units within said housing;
   (c) a first centrifugal fan arranged for drawing air through said units for removing dust from the air;
   (d) a plurality of ducts each connected to a corresponding one of said units at one end and to said first fan at the other end to provide passages for air from said units to said first fan, said ducts through a portion of their length being arranged in side-by-side relationship;
   (e) a second centrifugal fan for providing reverse flow of air through said ducts to said units, said second fan providing a high volume of air at low pressure;
   (f) a transverse duct connected to said second fan and extending transversely of said portion of said plurality of ducts and adjacent thereto;
   (g) a plurality of openings providing communication between said transverse duct and each of said plurality of ducts;
   (h) a plurality of control vanes, one such vane being disposed in each of said pluality of ducts, for controlling communication between said transverse duct and said plurality of ducts, each of said vanes being movable between a first position closing a corresponding one of said openings to block communication between said transverse duct and the corresponding one of said plurality of ducts and a second position providing communication with said transverse duct for effecting reverse flow of air through said corresponding one of said ducts and blocking passage of air through corresponding one of said ducts to said first fan whereby no air to be cleaned is directed toward the filter unit connected to said corresponding one of said ducts; and
   (i) rotatable means engaging said vanes for sequentially moving said plurality of vanes between said first and second positions.

2. The dust collector as recited in claim 1, wherein:
   (a) said transverse duct is positioned contiguous to said portion of said plurality of ducts;
   (b) each of said vanes is pivotally mounted at one end on the top wall of a corresponding one of said plurality of ducts for movement between a first position blocking the corresponding one of said openings and a second position in which its free end engages the bottom wall of said corresponding one of said plurality of ducts to direct reverse flow of air to the corresponding one of said units and to block flow of air through said corresponding one of said ducts to said first fan.

3. The dust collector as recited in claim 1, wherein said rotatable means comprises:
   (a) a shaft extending generally parallel to said transverse duct and a plurality of cams mounted in spaced relationship along the length of said shaft for actuating said vanes.

4. The dust collector as recited in claim 3, wherein:
   (a) said plurality of cams comprise a plurality of discs, each disc having a notch in the circumference thereof for receiving a corresponding one of said vanes in its second position;
   (b) said discs being positioned on said shaft with said notches angularly displaced relative to each other to provide sequential operation of said vanes.

5. The dust collector as recited in claim 4, wherein said plurality of ducts, discs and vanes comprise n ducts, n discs and n vanes, respectively, and wherein each notch extends over less than 360°/n of the circumference of the corresponding disc whereby during intervals of the cycle of rotation of said shaft all of said vanes are held in said first position and no reverse flow of air occurs.

6. The dust collector as recited in claim 3 wherein each of said plurality of ducts has a slot in one wall thereof and each of said discs extends through a corresponding one of said slots to engage a corresponding one of said vanes.

7. The dust collector as recited in claim 6 and further including a wall surrounding the portion of each of said discs extending beyond its corresponding duct to block leakage of air through said slots to the surrounding atmosphere.

8. The dust collector as recited in claim 1 wherein each of said filter units comprises a cylindrical filter and further including:
   (a) an impervious shield surrounding said cylindrical filter;
   (b) said shield having a frusto-conical shape with the large diameter portion at the bottom thereof;
   (c) said shield extending below the bottom of said cylindrical filter whereby dust removed from one of said filters during reverse air flow is shielded from the remaining filters.

9. The dust collector as recited in claim 1 wherein said first and second fans are mounted on a common shaft and driven by a single motor.

10. The dust collector as recited in claim 1 wherein each of said vanes is positioned and arranged such that in its second position it is disposed diagonally in the corresponding one of said plurality of ducts to direct reverse flow of air smoothly from said transverse duct to said corresponding one of said plurality of ducts.

* * * * *